US006634657B2

United States Patent
Graham (10) Patent No.: US 6,634,657 B2
(45) Date of Patent: Oct. 21, 2003

(54) SNOWBOARD TRAINER METHOD AND APPARATUS

(76) Inventor: Kurtis P. Graham, Box 5089, Glacier, WA (US) 98224

( * ) Notice: Subject to any disclaimer, the term of this patent is extended or adjusted under 35 U.S.C. 154(b) by 0 days.

(21) Appl. No.: 09/777,290

(22) Filed: Feb. 5, 2001

(65) Prior Publication Data

US 2002/0030333 A1 Mar. 14, 2002

Related U.S. Application Data (60) Provisional application No. 60/180,308, filed on Feb. 4, 2000.

(51) Int. Cl.⁷ .................................................. A63C 5/06
(52) U.S. Cl. ................................................. 280/14.27
(58) Field of Search .............................. 280/655.1, 637, 280/14.21, 14.22, 14.27, 14.28, 28.11, 28.14, 842, 87.041, 809; 441/68, 74

(56) References Cited

U.S. PATENT DOCUMENTS

| 3,269,742 A | | 8/1966 | Funyak et al. |
| 3,451,689 A | | 6/1969 | Owens |
| 3,529,847 A | | 9/1970 | Shores |
| 3,684,305 A | * | 8/1972 | McDonald et al. ......... 280/842 |
| 4,129,313 A | * | 12/1978 | Benson .................... 280/14.27 |
| 4,363,495 A | | 12/1982 | Henson |
| 4,533,150 A | * | 8/1985 | Hardy ...................... 280/14.28 |
| 4,744,584 A | * | 5/1988 | Monreal .................... 280/809 |
| 5,194,026 A | * | 3/1993 | Corwin et al. ............. 280/637 |
| 5,397,154 A | * | 3/1995 | Baldwin .................. 280/28.11 |

FOREIGN PATENT DOCUMENTS

| DE | 2013764 | * | 10/1971 | ............. 280/14.27 |
| DE | 3607808 | * | 9/1987 | ............. 280/14.21 |
| SU | 1391670 | * | 4/1988 | ............. 280/14.27 |

* cited by examiner

Primary Examiner—Frank Vanaman
(74) Attorney, Agent, or Firm—Robert B. Hughes; Hughes Law Firm, PLLC (57) ABSTRACT

A support apparatus having support members attached to a snowboard. The support members having handles that are adapted to be grasped by a user where the user exerts a vertical force upon the handles and a manner to create a downward force upon a support surface that is attached to the snowboard. The user is not bound to the snowboard.

20 Claims, 9 Drawing Sheets

SNOWBOARD TRAINER METHOD AND APPARATUS

RELATED APPLICATIONS

This application claims priority of U.S. Provisional Application Ser. No. 60/180,308, which was filed Feb. 4, 2000.

FIELD OF THE INVENTION

The invention relates to a training device to aid a beginner snowboarder. Particularly, the invention relates to a support apparatus that can be retrofitted to existing snowboards to provide handles and allow the footing of the user to not be locked into a snowboard.

BACKGROUND ART

A search of the patent literature has a number of patents directed toward these problems, these being the following:

U.S. Pat. No. 4,353,495 Henson, shows an handle system secured to a pair of skis that are fastened together. FIGS. 9–12 show various orientations of the apparatus of the present invention.

U.S. Pat. No. 3,451,689 Owens, shows a ski like vehicle which is provided with a handle as well as a seat 42. The handle is secured to the ski by a length of spring material 18, rather then being secured to the top surface.

U.S. Pat. No. 3,529,847 Shores, shows a ski which is provided with both binding like devices 10, and 12, as well as a handle secured to the front, which is used to provide torsion to the ski and flex it.

Further, the break lever 108 is used to adjust the rotation of the support rod 34. When the lever 108 is released the break shoes 88 and 90 clamp upon the mounting cleat 18.

U.S. Pat. No. 3,269,742 Funyak et al, shows a ski with a handle secured to it as well as binding areas 16 and 18. Apparently the undersurface 28 is required to bind the handle 38 to the conventional ski 10.

None of the background art discloses show a handle device that can be retrofitted to an existing snowboard where the handles provide balance and control of the snowboard.

SUMMARY OF THE INVENTION

A support apparatus adapted to be attached to a snowboard for the snowboard has an upper surface with a conventional mounting region. The support apparatus is adapted to support a user (a beginner snowboarder or a snowboarder looking for an alternative means of travel). The support apparatus has a mounting platform that has first and second lateral locations located on laterally opposite sides of the mounting platform. A support surface is located on the central portion of the mounting platform and is adapted to support the user. A support member has a central axis and a frame member. The frame member has a first attachment location that is pivotally attached to the first lateral location of the mounting platform. Further, a second attachment location on the frame is pivotally attached to the second lateral location of the mounting platform. The support member further comprising a handle positioned at the opposite region on the frame from the first and second attachment locations and the handle is adapted to be grasped by the user for balanced and support. The support member is adapted to pivot about the first and second attachment locations in a manner so when the central axis of the support member is adjacent to the snowboard it is in a storage position. Further, the support member can pivot about the first and second attachment locations so the support member is substantially vertical and is in an operative position.

DETAILED DESCRIPTION OF THE PREFERRED EMBODIMENT

Throughout this description reference is made to top and bottom, front and rear. The device of the present invention can, and will in practice, be in numerous positions and orientations. These orientation terms, such as top and bottom, are obviously used for aiding the description and are not meant to limit the invention to any specific orientation.

In general, the apparatus is a support structure adapted to be retrofitted to snowboards. The apparatus provides supports that are adapted to be grasped by the users hand and a surface that supports the footing for the end-user.

Figure 2:
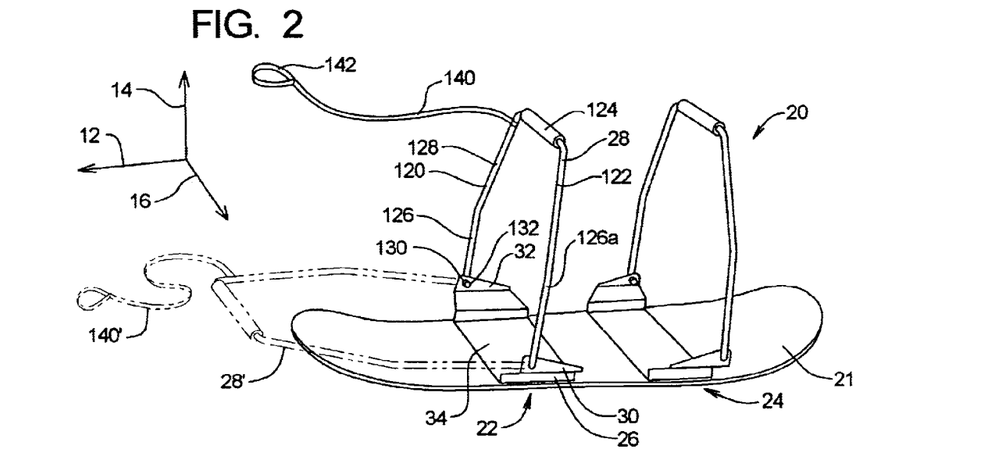
FIG. 2 is an isometric view of the modified snowboard in an operative position with tether straps attached to the handle.

An axis system is defined whereas shown in FIG. 2, the axis indicated at 12 is a longitudinal axis, the axis indicated at 14 is a vertical axis, and finally the axis indicated at 16 refers to a lateral direction.

Figure 1:
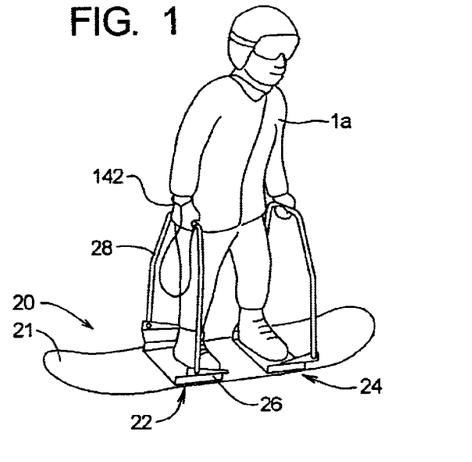
FIG. 1 is an isometric view of the modified snowboard with the user standing thereon.

As seen in FIG. 1, the apparatus 20 comprises a first support system 22 and a second support system 24. The apparatus 20 is adapted to be mounted to a snowboard 21. In the preferred form, the first support system 22 is similar to the second support system 24 and hence the first support system 22 will be described in detail with the understanding the detailed description is applicable to the second support system 24. The first support system 22 comprises a mounting platform 26 and a support member 28. As shown in FIG. 2, the mounting platform 26 comprises a first lateral portion 30 and a second lateral portion 32. Further, a central portion (or region) is indicated at 34. An attachment region 36 is located in and the central portion 34 and comprises a plurality of surfaces 38 defining holes 40. The attachment region is adapted to facilitate mounting to a snowboard 21. The holes 40 correspond in location to the threaded holes of the snowboard 21. Of course any conventional method of attaching the mounting platform 26 to the snowboard 21 can be employed. The preferred form would be using flathead screws to extend through the holes 40 into threaded recessed regions of the snowboard 21.

The portions contained in the first and second lateral locations 30 and 32 are substantially similar hence the first lateral portion 30 will be discussed in detail with the understanding the description is relevant to the second lateral portion 32. A first connector region 42 is located in the first lateral portion 30. The first connector region 42 comprises a pivotal attachment system 44 wherein the preferred form, the system 44 comprises a surface defining cylindrical hole.

Figure 4:
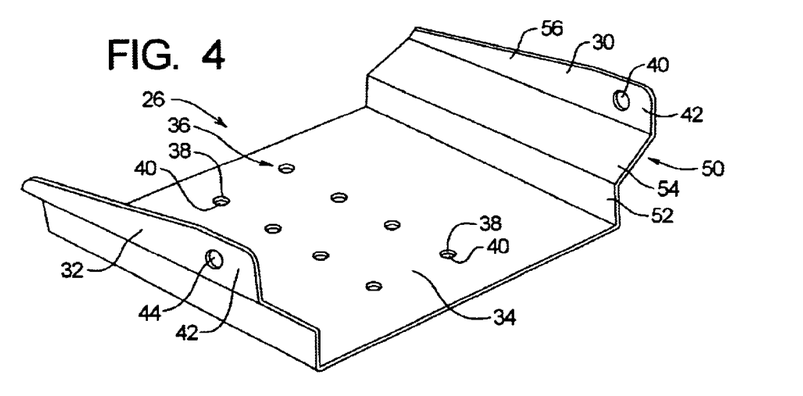
FIG. 4 is an isometric view of the mounting platform.
Figure 5A:
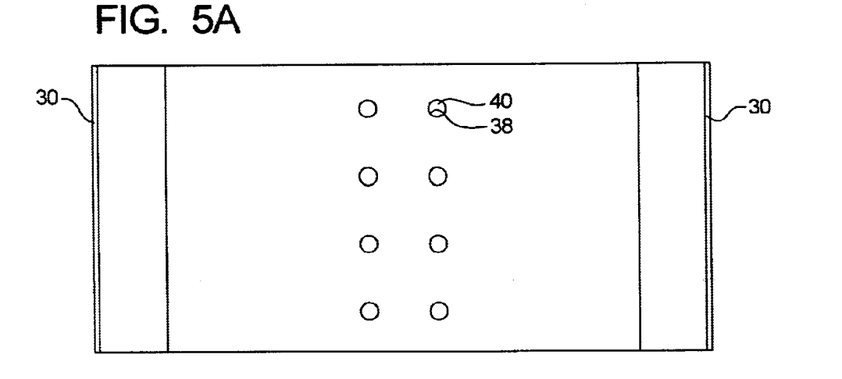
FIG. 5a is a top view of the mounting platform.
Figure 5B:
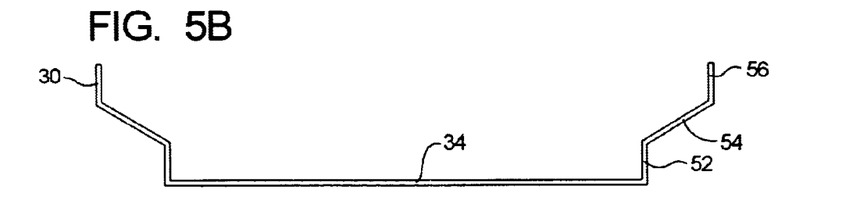
FIG. 5b is a lengthwise into of the mounting platform along the longitudinal axis.
Figure 5C:
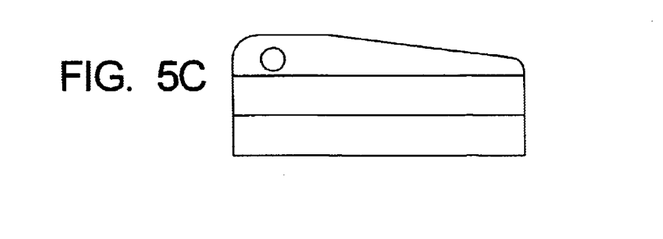
FIG. 5c is a lateral view of the mounting platform.

A support flange 50 is located in the first lateral portion 30, and comprises a substantially vertical section 52, a laterally extending section 54 and a vertical section 56. In the preferred form, the mounting platform 26 is made from a continuous piece of material that is resistant to cold weather. The mounting platform 26 can be bent into the orientation as shown in FIG. 4 or can be constructed by such conventional means such as plastic injection or casting.

The upper surface of the mounting platform 26 is defined as a support surface that is adapted to support the bottom portion of the boot of the user. In the preferred form, the support surface would have a sufficient coefficient of friction between itself and the sole of common boots to prevent the user from slipping off of the mounting platform 26. In one form, the support surface can have a gnarled or gritty surface to provide the proper traction.

Figure 6:
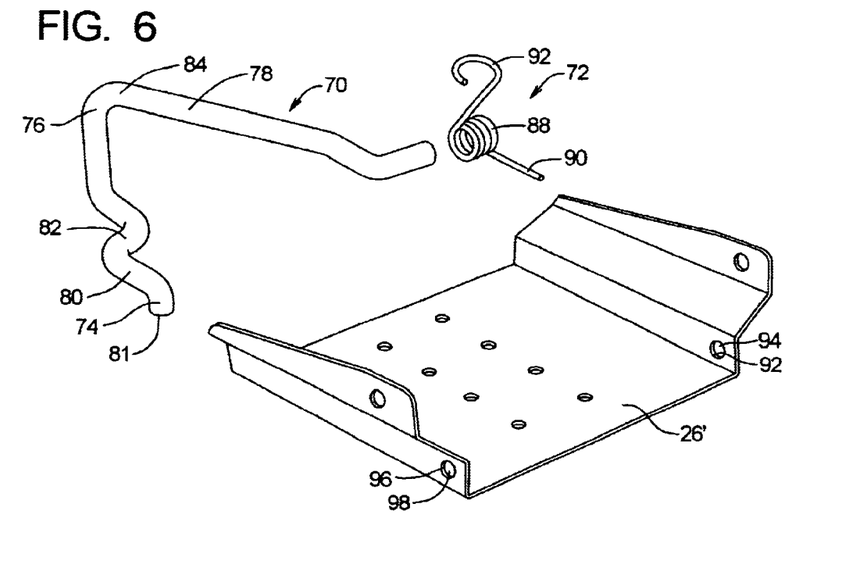
FIG. 6 shows a second embodiment of the mounting platform where a break mechanism is employed.

FIG. 6 shows a second embodiment for the mounting platform 26 where a braking mechanism 70 is employed. The braking mechanism comprises a biasing system 72, a surface contact region 74, and a pressure application region 76. In the preferred form, a unitary member 78 is employed having an extension 80, a first pivot region 82, a central region 84 and a second pivot region 86. The biasing system 72 is a torsional spring 88 having a first extension 90 and a second extension 92. The extension 80 has a contact surface 81 that is adapted to engage and displace snow.

The mounting platform 26 has a first surface 92 defining an opening 94 that is adapted to allow the second pivot region 86 that the unitary member 78 to extend therethrough. A second surface 96 defines a second opening 98 that is adapted to allow the extension 80 and the first inner region 82 to extend therethrough.

Regarding the assembly of the braking system 70, the extension 80 is inserted through the second opening 98 where the unitary member 78 is rotated about its various axes to cause the first pivot region 82 to be pivotally engaged within the second opening 98. Thereafter, the central region of the torsional spring 88 is inserted through the second pivot region 86 and the second inner region is temporarily bent laterally inwardly and inserted through the first opening 94. The extensions 90 and 92 are situated in such a manner so the first extension exerts a force upon the upper surface of the mounting platform 26 and a second extension 92 exerts a vertical force upon the center region 84.

Thereafter, when the user applies pressure to the pressure application region, a moment is created about the pivot regions 82 and 86 which overcomes the moment caused by the torsional spring 88. And hence, the surface contact region 74 is raised from the snow and does not inhibit the traveling of the snowboard 21. If the user steps off the mounting platform 26, the torsional spring 88 applies a moment about the pivot regions 82 and 86 and the contact region 74 engages the snow and causes a fin-like displacing action to slowdown the snowboard and eventually stop it from traveling down the hill side.

Figure 7:
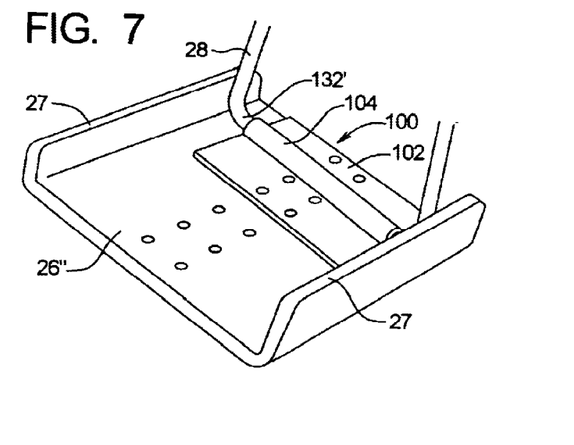
FIG. 7 is an isometric view of a third embodiment of the mounting platform.
Figure 8:
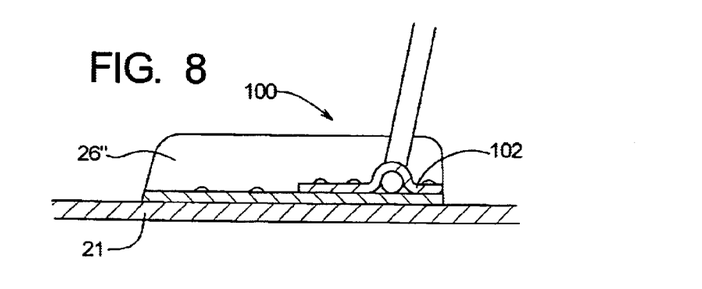
FIG. 8 is a side lateral view of the third embodiment of the mounting platform.

FIGS. 7 and 8 show a second embodiment of an attachment mechanism 100. The attachment mechanism 100 comprises a plate 102 having a laterally extending recessed region 104 that is adapted to be received by base extensions 132' of a support member 28 described further herein. The plate 102 is mounted to the mounting platform 26" using conventional mounting techniques.

The second embodiment of the support platform 26" is particularly advantageous because it can be manufactured by material such as a plastic, and the plate 102 can be constructed from a separate material such as steel or aluminum. The lateral portions 27 are preferably rounded to prevent injuring when the user falls down upon them.

The mounting platform 26 can be constructed manufactured from such techniques such as cavity injection molded, vacuum molded, stamp, or fiberglass lay-up.

There will now be a discussion of the support member 28 with reference to FIGS. 2, 3, 9 and 10.

As seen in FIG. 2, the support member 28 comprises a first support 120, a second support 122, and a handle 124. The first and second supports 120 and 122 are substantially similar and the following description is relevant to both members. The first support 120 has a first region 126 and a second region 128. The first region has an attachment location 130 which comprises a laterally extending portion 132 that is adapted to be received and pivotally mounted to the opening 44 of the mounting platform 30. The support member 28 has a central axis that is defined as to extend through the center of rotation of the attachment location 130 and extend through the handle region indicated at 124. The first and second supports 120 and 122 are collectively referred to as a frame member.

Figure 3:
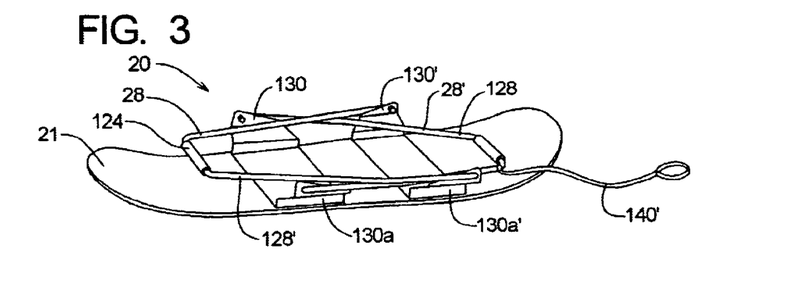
FIG. 3 is an isometric view of the modified snowboard in a storage position.

The first region 126 extends substantially in the plane defined by the lateral axis 16 (the plane extending in the vertical and longitudinal directions). The second region 128 extends laterally inwardly to the handle portion 124. The laterally inwardly placement of the second region 128 allows the support member 28 and 28' to be folded in a manner as shown in FIG. 3. The attachment locations 130 allow pivotal rotation about the lateral axis for the support members 28 and 28'.

Now referring back to FIG. 2, the tethers 140 can be employed and as shown in FIG. 1, the loop member 142 can be attached to the users wrist so the snowboard 21 does not freely slide down the snow hill surface. Further, the support member 28 can extend longitudinally outwardly to the position indicated in FIG. 2 at 28'. In this configuration, the snowboard 21 and the apparatus 20 can be pulled by the tether 140' where the center of drag of the snowboard 21 is longitudinally rearward with respect to the center of pull placed upon the tether 140. Additionally, the snowboard 21 and the apparatus 20 can be pulled when in a storing position as shown in FIG. 3 using the tether 140'.

In the broader scope of the present invention the support members 28 can be removable from the mounting platform 26. For example, the support members 120 and 122 can be displaced laterally to be removed from the hole (pivotal attachment system) 44 and the support member 28 would be removed.

Figure 9:
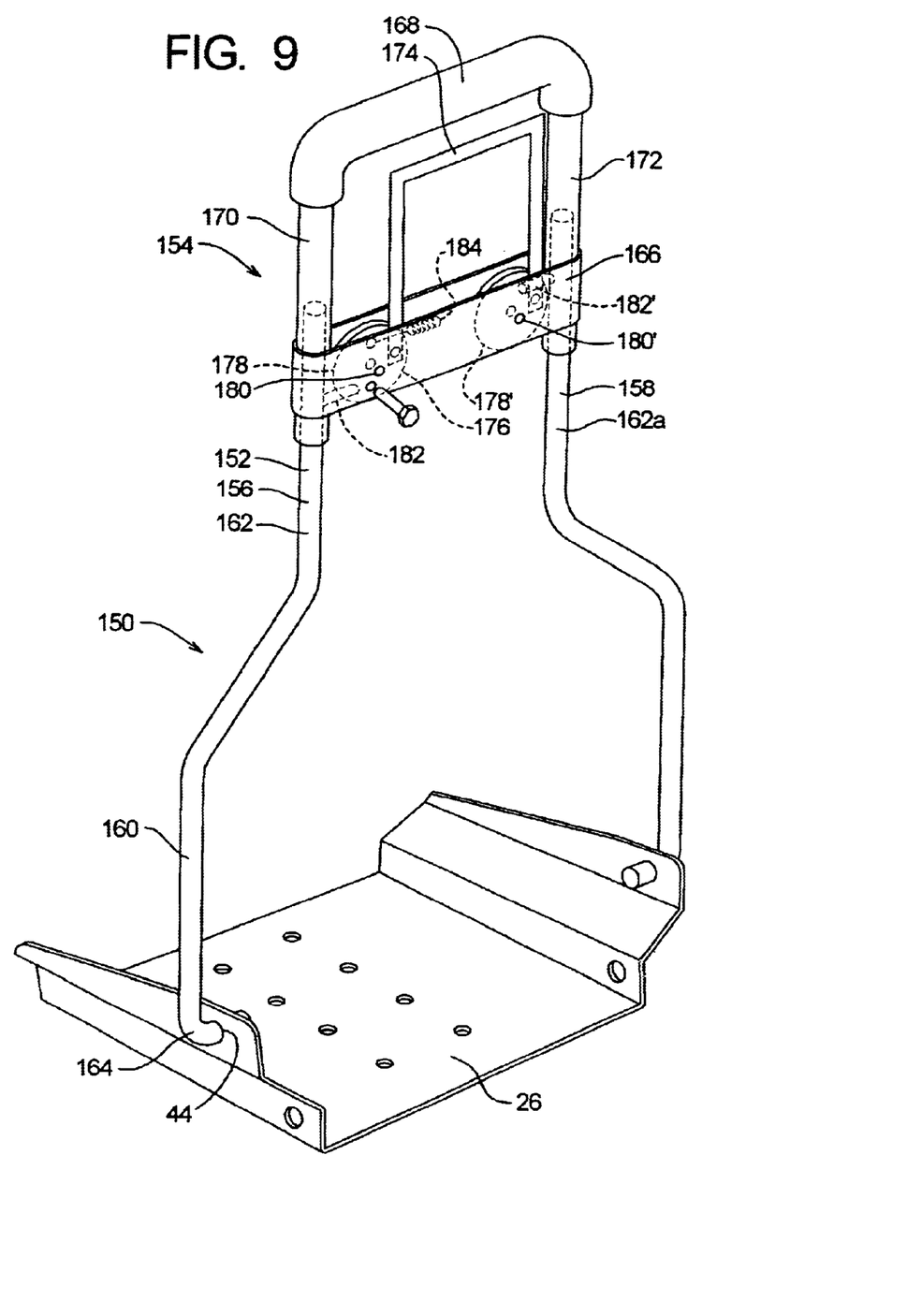
FIG. 9 shows an isometric view of a second embodiment of a support member having an adjustable handle mechanism.

As seen in FIG. 9, a second embodiment of a support member is shown wherein the handle 168 is adjustable along the central axis of the support member 150.

The support member 150 comprises a frame member 152 and an adjustable handle mechanism 154. The frame member 152 comprises a first support 156 and a second support 158. The first support 156 (as well as the second support 158) comprises a first region 160 and a second region 162. The first region 160 has an attachment location 164 that is pivotally attached to the opening 44 of the mounting platform 26. As with the previous support member embodiment, the second region 162 is positioned laterally inwardly to facilitate folding of the apparatus similar to the manner as shown in FIG. 2 when in the apparatus 20 is in a storage position.

The adjustable handle mechanism 154 comprises a locking mechanism 166 and a handle region 168. The locking mechanism 166 comprises a first telescopic member 170 and a second telescopic member 172 that are adapted to house and telescopically extend around the second regions 162 and 162a of the frame member 152. The locking mechanism 166 further comprises an adjustment handle 174 and an adjustment mechanism 176. The adjustment mechanism 176 comprises a first slider crank member 178 and a second slider crank member 178'.

The slider crank members 178 pivot about pivot point 180 in a manner so as the adjustment handle 174 is displaced outwardly along the support members central axis, the adjustment pins 182 are displaced laterally inwardly and disengage from adjustment holes located in the frame member 152. A spring member 184 biases the slider crank members 178 so the adjustment pins 182 extend laterally outwardly into the adjustment holes. Of course a number of locking mechanisms can be employed to adjust the handle 168 along the central axis of the support member 150.

Figure 10:
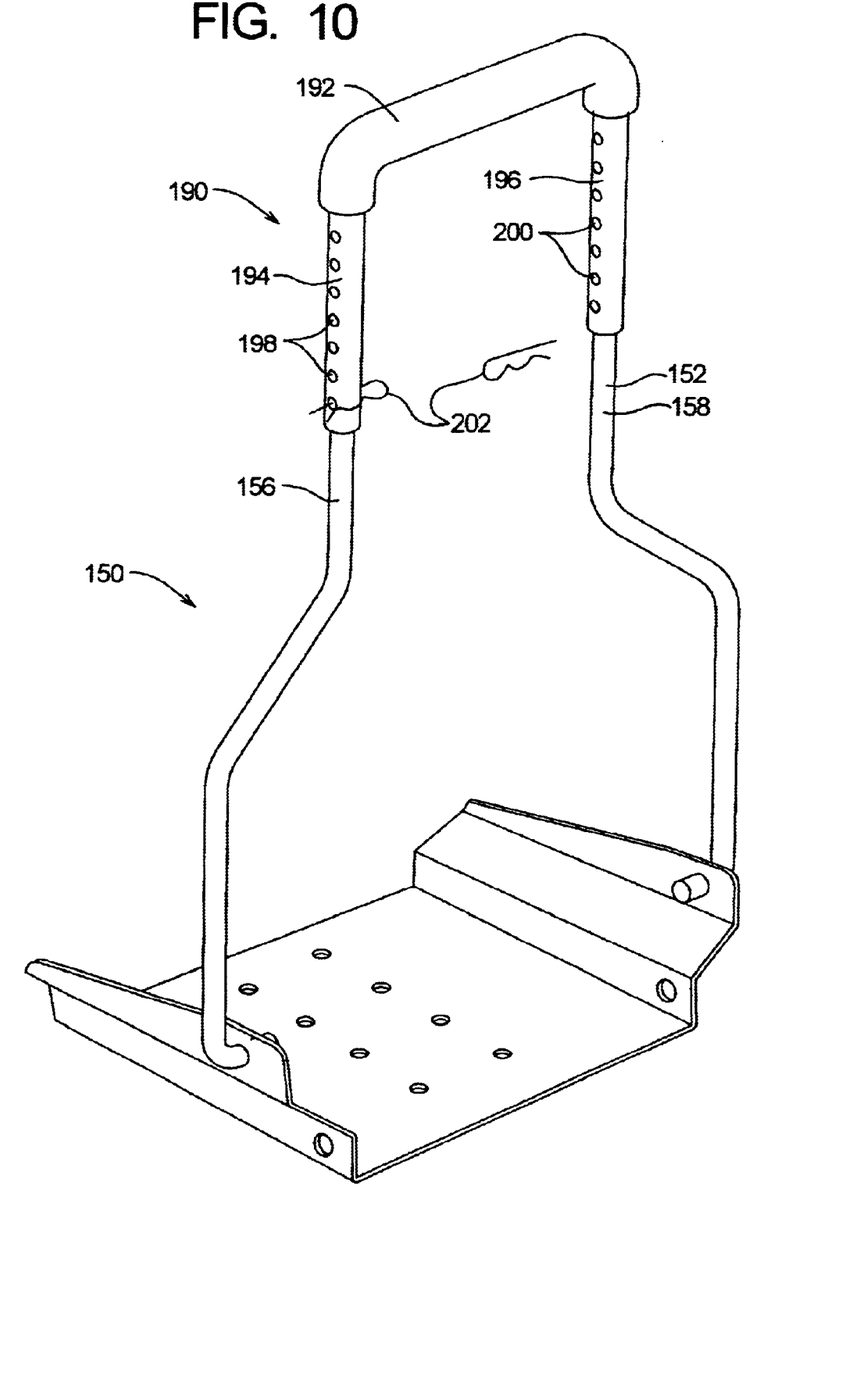
FIG. 10 shows an isometric view of a third embodiment of an adjustable support member.

FIG. 10 shows a second embodiment of an adjustable handle mechanism 190 where the handle 192 is attached to two tubular members 194 and 196 which have surfaces defining a plurality of adjustment holes 198 and 200. The adjustment holes are adapted to align with the adjustment hole of the first and second supports 156 and 158. The adjustment pins 202 can be employed to lock the 192 to the frame 152.

Figure 10A:
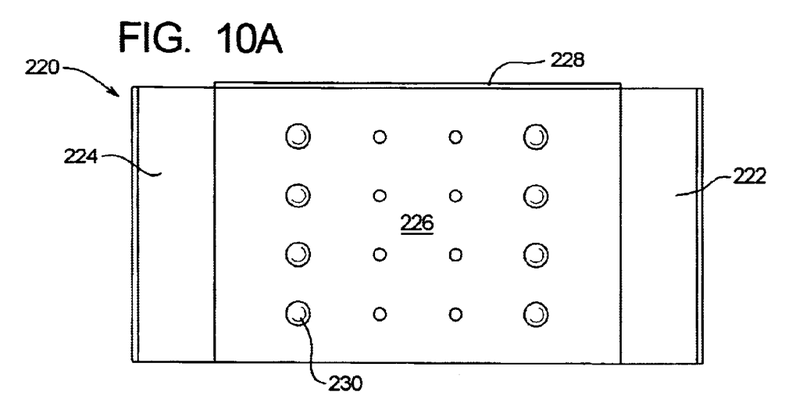
FIG. 10a is a top view of another embodiment of a mounting platform.
Figure 10B:
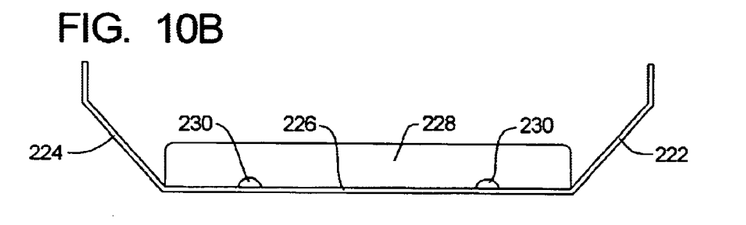
FIG. 10b is a longitudinal view of a mounting platform.
Figure 10C:
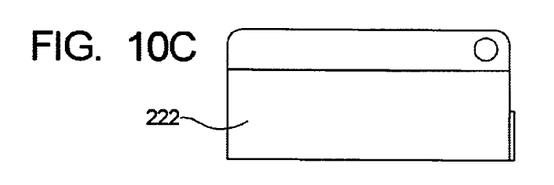
FIG. 10c is a side view along the lateral axis of another embodiment of a mounting platform.

FIGS. 10a, 10b, and 10c show a second embodiment for the mounting platform 220 which comprises a first lateral section 222, a second lateral section 224, a central region 226, and a laterally extending flange 228 to assist stability of the foot of the user. Further, indentations 230 are created to provide frictional support for the user.

Figure 11:
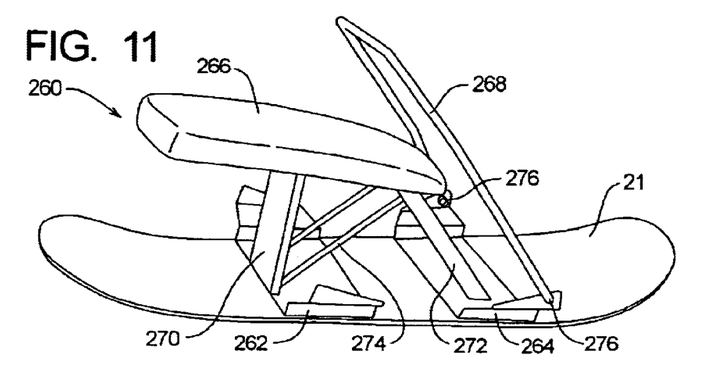
FIG. 11 shows an attachment device to snowboard.

As shown in. FIG. 11, the device 260 comprises a first mounting location 262, a second mounting location 264, a seat 266 and a handle bar 268. The first mounting location to 62 is adapted to be mounted to the mounting region of the snowboard 21. A support 270 and a second support 272 are attached to the mounting locations 262 and 264 respectively and support the seat 266. The cross support 274 triangulates the mounting system to provide additional rigidity. The handle 268 is pivotally attached to the pivot locations 276.

Figure 12A:
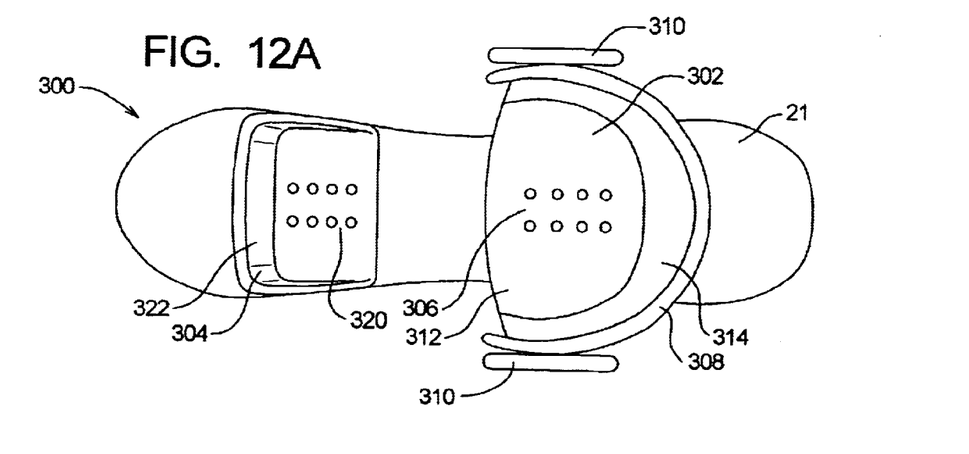
FIG. 12a is a top view of a second embodiment of a device to be attached to a snowboard.
Figure 12B:
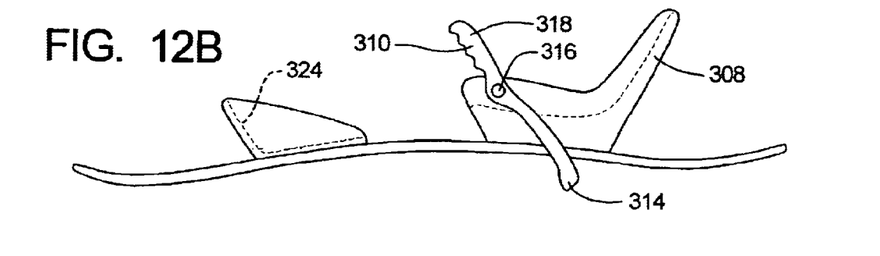
FIG. 12b is a side view of the second embodiment of the device to be attached to snowboard.
Figure 12C:
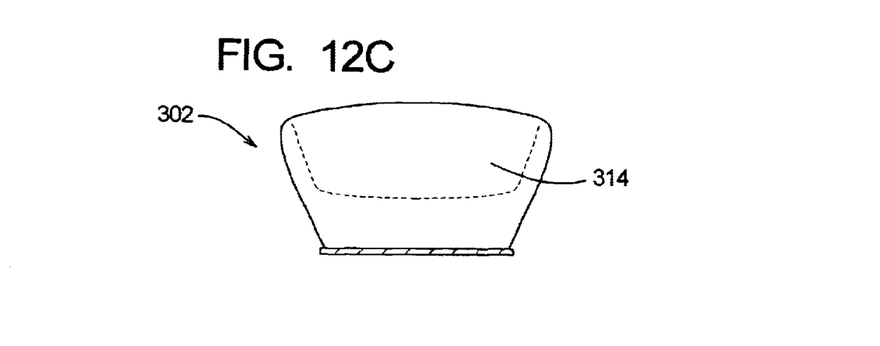
FIG. 12c is a rearview along the longitudinal axis of the second embodiment of the device to be attached to snowboard.

As shown in FIG. 12, the device 300 comprises a seat member 302 and a foot member 304. The seat member 302 has a mounting location 306, a frame portion 308 and a control mechanism 310. The frame member 308 comprises a base portion 312 and a back support 314. The mounting location 306 is adapted to allow the seat member 302 to be retrofitted to existing snowboards 21. The control mechanism 310 comprises a snow contact region 314 a pivot point 316 and a handle 318. In a preferred form, two control mechanisms are employed and located at the lateral portions of the seat member 302. The control mechanism 310 provides two functions, first, by applying a moment about the pivot point 316, the snow contact region 314 provides drag about a vertical center axis of the snowboard 21 which turns the snowboard 21. Secondly, on applying a moment about both control mechanisms 310, the snowboard 21 reduces its speed and comes to a stop.

The foot member 304 comprises a mounting section 320 and a foot support 322. The mounting section 320 is adapted to be mounted to existing snowboards 21. The foot support 322 has a surface 324 that is adapted to support the boot (winter footwear) of the user.

Figure 13:
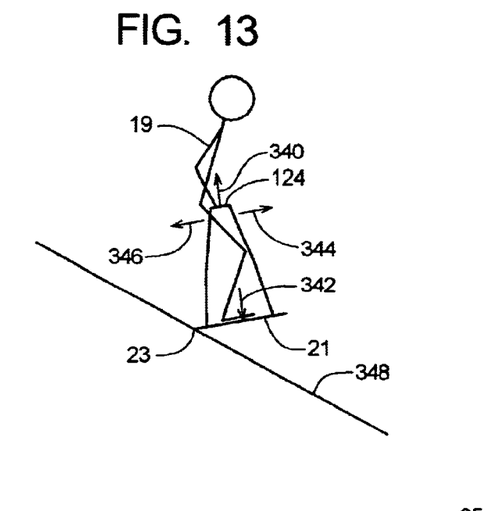
FIG. 13 is a schematic view illustrating the force vectors acting upon the modified snowboard.

There will now be a discussion of the force diagrams and use of the apparatus 20 with reference to FIGS. 13–16. The support members 28 are relatively rigid and can withstand compression from the user as well as tension. The apparatus 20 and the snowboard 21 are collectively referred to as a modified snowboard. As shown in FIG. 13, the user 19 is conducting a heel turn. To create a lift about the lateral edge 23 of the snowboard, the user applies a vertical force indicated at 340 acting upon the handle 124. This pulling action creates a second force 342 upon the snowboard 21. It should be noted that conventional bindings have a similar function where the snowboarder would exert a vertical force on the portion of the binding that is above the snowboarder's toes and a counteracting force occurs at the heel portion of the snowboarder's foot to allow the snowboard to slide upon the edge 23. The present invention allows the capabilities of a binding without the constructive nature that is inherent with conventional bindings. Further, the user 19 can displace the board in the direction indicated by arrow is 344 and 346. This allows the ability to rotate the board about the longitudinal axis to create a desirable angle with respect to the hillside surface 348. A similar analysis can be conducted for a toe turn.

It should be noted that an important aspect of the invention is that the user need not have bindings or otherwise be bound into the snowboard, as is the case with all conventional bindings in the prior art. Further, the lateral flanges 30 and 32 assist in maintaining the lateral position of the end-users footwear while the end-user is not bound to the snowboard 21.

Figure 14:
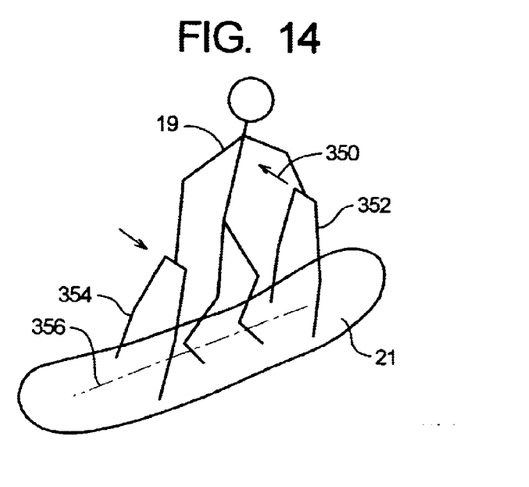
FIG. 14 is an isometric schematic view showing the torsional effects a user can exercise upon the snowboard about the longitudinal axis.

An additional benefit to the present invention is schematically shown in FIG. 14. As shown in this figure, the user 19 applies a lateral force indicated at 350 upon the support member 352 and an opposing lateral force upon the support member 354. This action creates a torsional moment about the longitudinal axis 356 of the board 21. This in turn creates a torsional deformation of the board which can facilitate turning.

Figure 15:
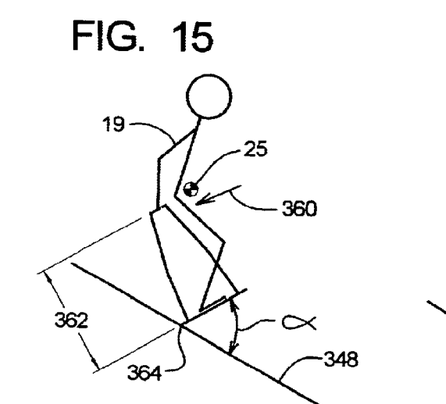
FIG. 15 is a schematic view illustrating the ability of a user to displace the modified snowboard counterclockwise with respects to the user center of gravity.
Figure 16:
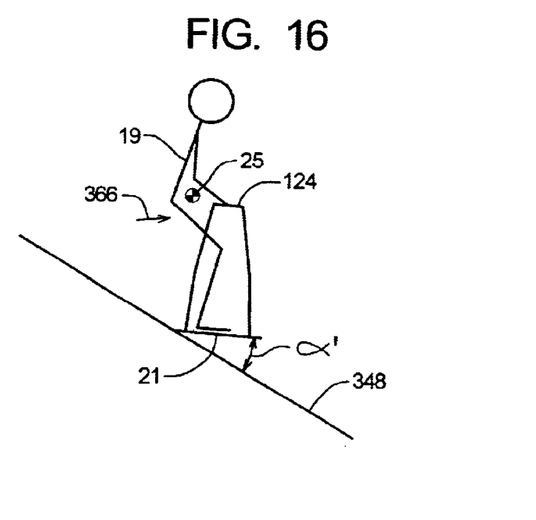
FIG. 16 is a schematic view illustrating the ability of the user to displace the modified snowboard clockwise.

As shown in FIGS. 15 and 16, the user 19 displaces a modified snowboard rearwardly by applying a force indicated at 360 so the modified snowboard rotates counterclockwise with respects to the user's center of gravity 25. This rotation causes an angle α with respects to the mean hillside slope 348. This movement is advantageous because the user 19 can create an increased angle α than conventional snowboard bindings because the handles are a height indicated that 362 from the contact edge 364. The height 362 can be in the range of 1.5 ft.–4.5 ft., or in a preferred form the height range 362 is between 2.5 ft.–3.5 ft. to provide a proper moment arm about the contact edge 364 and have an ergonomic position of the handles 124 for the user.

As shown in FIG. 16, the user applies a force 366 to the handles 124 to rotate the modified snowboard clockwise with respects to the user's center of gravity 25. This creates a smaller α' with respects to the mean slope 348. Hence, the user 19 has increased control over the modified snowboard (i.e. the snowboard 21 with the apparatus 20 attached thereon).

Figure 17:
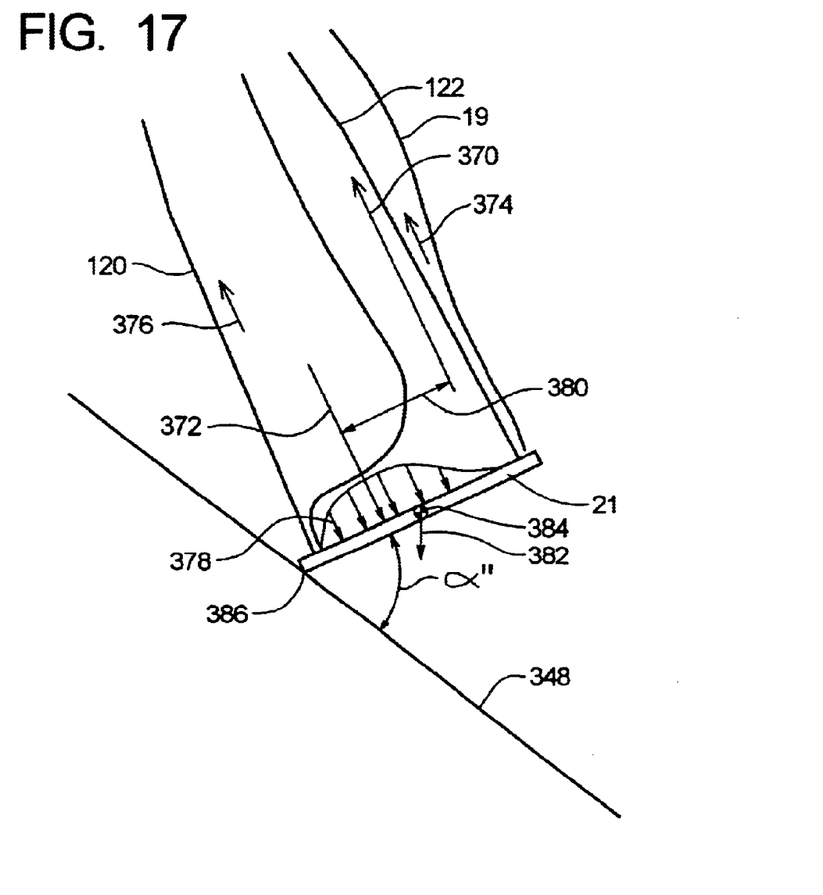
FIG. 17 is a schematic view illustrating the force vector diagrams acting upon the snowboard to create a proper moment thereon to induce the angle α".

As shown in FIG. 17, a user 19 is conducting a toe turn. For the board 21 to be positioned at the angle α" with respects to the mean snowline slope 348, a counterclockwise moment about the board 21 must be applied. This moment is created by the resultant force is 370 and 372. The resultant force 370 is a combination of the force factors 374 and 376, which are the tension applied to the second supports 122 and the first supports 120. The resultant force 372 is a product of the force distribution 378 that is a pressure distribution curve from the footing of the user 19 upon the contact surface of the modified snowboard. A perpendicular distance 380 indicates the moment arm to calculate the moment created by resultant forces is 370 and 372. Of course a similar analysis can be conducted for a heel turn where the resultant forces 370 and 372 are located on laterally opposite sides with respects to one another. The moment created from force 370 that counteracts the moment created by the center gravity force 382 of the snowboard is referred to as a positive moment whether the user is conducting a toe turn or a heel turn.

Therefore, the moment induced by the upward force 370 counteracts the downward force 382 acting at the center of gravity 384 of the snowboard 21. The moment does not have to be that large in magnitude, but only sufficient to oppose the moment created by the force 382 multiplied by the perpendicular distance from the contact region 386 in order to keep the board 21 in close proximity to the footing of the user 19.

Therefore, it can be appreciated that the apparatus 20 provides increased control over the modified snowboard and further allows the user 19 to not have their footing confined in a prior art restricted binding.

While the invention is susceptible of various modifications and alternative forms, specific embodiments thereof have been shown by way of example in the drawings and will herein be described in detail. It s should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. A support apparatus which is adapted to be attached on a snowboard as a training device to aid a beginner snowboarder, and which has a longitudinal axis, a transverse axis, a central portion, two end portions, and first and second longitudinally spaced support locations which are positioned to permit the user's feet to be located thereon, to support the user on the board at a central user location, said apparatus comprising:

a) a mounting section having first and second longitudinally spaced mounting portions located longitudinally between the two end portions of the snowboard on opposite sides of the central user location;

b) first and second longitudinally spaced support sections, each having,
   i) a lower connecting portion, by which said first and second support sections are connected to the first and second mounting portions, respectively, for rotation about a respective transverse mounting axis for rotational movement toward and away from the central user location;
   ii) an upper handle portion which is positioned and arranged to be gripped by the user when the user is at the central user location;
   iii) an intermediate support portion connected between the connecting portion and the handle portion, the connection portion, support portion and handle portion being arranged and constructed so that each support section is constrained to rotate, relative to the snowboard, substantially in a longitudinally aligned vertical plane perpendicular to the transverse axis, c) the handle portions of the first and second support sections having first and second gripping portions located longitudinally on opposite sides of the user when the user is at the central user location, and said apparatus being arranged so that the user at the user location on the snowboard is able to pull or push on either or both of the handle portions.

2. The support apparatus as recited in claim 1 wherein said handle portion of each support section has an adjustment mechanism to adjust the handle portion to a plurality of height positions.

3. The support apparatus as recited in claim 1 wherein each handle portion is slidably connected to the support portion and there is a looking mechanism that positions the handle portion at a position along the support portion.

4. The apparatus as recited in claim 1 further comprising a tether operably attached to the apparatus, with the tether having a connector that is adapted to be connected to the user.

5. The apparatus as recited in claim 1 wherein the lower connecting portions of the first and second support sections are located from the central user location longitudinally outwardly of the first and second longitudinally spaced support locations at which the user's feet are to be located.

6. The apparatus as recited in claim 1, wherein each of said first and second support sections can be rotated downwardly toward the central user location to be positioned adjacent to the snowboard, so as to be in a stowed position.

7. The apparatus as recited in claim 1 wherein the first and second mounting portions each comprise a mounting platform having first and second laterally spaced locations on opposite sides of the mounting platform, and the lower connecting portion of each of the support sections is connected to said mounting platform and has connecting members at said laterally spaced locations proximate to the mounting platform.

8. The apparatus as recited in claim 7, wherein the intermediate support portion of each support section comprises laterally spaced support members extending upwardly to opposite end portions of the handle portions.

9. The apparatus as recited in claim 8, wherein lower end portions of each of the two support sections have pivot connections at laterally spaced side portions of the related mounting platform.

10. The apparatus as recited in claim 9, wherein each mounting platform has at perimeter portions thereof upstanding flange members to contain the feet of the user.

11. The apparatus as recited in claim 8, wherein the laterally spaced support members of each intermediate support portion are connected to the platform and to the handle in a manner to restrain relative angular rotational movement between the handle and the intermediate support portion, and to restrain angular movement of the intermediate support portion laterally relative to the mounting platform.

12. The apparatus as recited in claim 1, wherein the first and second longitudinally spaced mounting portions are positioned each at a respective one of the first and second longitudinally spaced support locations, each of said mounting sections comprising a mounting platform connected to the snowboard.

13. A snowboard assembly which is adapted to be used as a training device to aid a beginner snowboarder, said snowboard assembly comprising:
 a) a snowboard which has a longitudinal axis, a transverse axis, a central portion, two end portions, and first and second longitudinally spaced support locations which are positioned to permit the user's feet to be located thereon, to support the user on the board at a central user location, said apparatus comprising:
 b) a support apparatus, said apparatus comprising:
  i) a mounting section having first and second longitudinally spaced mounting portions located longitudinally between the two end portions of the snowboard on opposite sides of the central user location;
  ii) first and second longitudinally spaced support sections, each having, a lower connecting portion, by which said first and second support sections are connected to the first and second mounting portions, respectively, for rotation about a respective transverse mounting axis for rotational movement toward and away from the central user location; an upper handle portion which is positioned and arranged to be gripped by the user when the user is at the central user location; an intermediate support portion connected between the connecting portion and the handle portion, the connection portion, support portion and handle portion being arranged and constructed so that each support section is constrained to rotate, relative to the snowboard, substantially in a longitudinally aligned vertical plane perpendicular to the transverse axis;
 c) the handle portions of the first and second support sections having first and second gripping portions being located longitudinally on opposite sides of the user when the user is at the central user location, and said assembly being arranged so that the user at the user location on the snowboard assembly is able to pull or push on either or both of the handle portions.

14. The assembly as recited in claim 13 Wherein the lower connecting portions of the first and second support sections are located from the central user location longitudinally outwardly of the first and second longitudinally support locations at which the user's feet are to be located.

15. The assembly as recited in claim 13, wherein each of said first and second support sections can be rotated downwardly toward the central user location to be positioned adjacent to the snowboard, so as to be in a stowed position.

16. The apparatus as recited in claim 13 wherein the first and second mounting portions each comprise a mounting platform having first and second laterally spaced locations on opposite sides of the mounting platform, and the lower connecting portion of each of the support sections is connected to said mounting platform and has connecting members at said laterally spaced locations proximate to the mounting platform.

17. The assembly as recited in claim 16, wherein the intermediate support portion of each support section comprises laterally spaced support members extending upwardly to opposite end portions of the handle portions.

18. A method of using a training apparatus for a snowboard, where the snowboard has a longitudinal axis, a transverse axis, a central portion, two end portions, and first and second longitudinally spaced support locations at which the user's feet to be located, to support the user on the board at a central user location, said method comprising:
 a) providing a training apparatus comprising:
  i) a mounting section having first and second mounting portions location;
  ii) first and second longitudinally spaced support sections, each having,
   a lower connecting portion, by which said first and second support sections are connected to the first and second mounting portions, respectively, for rotation about a respective transverse mounting axis for rotational movement toward and away from the central user location;
   an upper handle portion which is positioned and arranged to be gripped by the user, with first and second gripping portions being located longitudinally on opposite sides of the user when the user is at the central user location;
   an intermediate support portion connected between the connecting portion and the handle portion, the connection portion, support portion and handle portion being arranged and constructed so that each support section is constrained to rotate, relative to the snowboard, substantially in longitudinally aligned vertical plane perpendicular to the transverse axis;
 b) mounting the training apparatus to the snowboard so that the mounting portions are located longitudinally between the two end portions of the snowboard and on opposite sides of the central user location;
 c) the user positioning the user's feet on or adjacent to the support location and grasping the handle portions in the user's hands for riding the snowboard over a snow surface;
 d) manipulating the snowboard during travel over a snow surface, and pushing or pulling on either or both of the handles to accomplish one or more of the following:
  i) exerting a vertical force on either or both of said connecting portions;
  ii) exerting a force having both vertical and longitudinal force components either toward or away from the central user location;
  iii) exerting a lateral force on either or both of the handles to exert a lateral rotational force to tilt the snowboard;
  iv) exerting lateral forces in opposite lateral directions to exert a torsional force on the snowboard relative to the longitudinal axis.

19. The method as recited in claim 18 further comprising, moving each handle portion slidably relative to the support portion, positioning the handle portions at a position along the support portion and locking the positions of the handle portions at a position along the support portion.

20. The method as recited in claim 18 further comprising: attaching a tether to the apparatus and to the user.

* * * * *